United States Patent
Kim et al.

(10) Patent No.: US 10,484,900 B2
(45) Date of Patent: Nov. 19, 2019

(54) METHOD AND DEVICE ALLOWING TERMINAL TO REPORT MEASUREMENT RESULT

(71) Applicant: LG ELECTRONICS INC., Seoul (KR)

(72) Inventors: Sangwon Kim, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/755,403

(22) PCT Filed: Sep. 19, 2016

(86) PCT No.: PCT/KR2016/010398
§ 371 (c)(1),
(2) Date: Feb. 26, 2018

(87) PCT Pub. No.: WO2017/048086
PCT Pub. Date: Mar. 23, 2017

(65) Prior Publication Data
US 2018/0255473 A1  Sep. 6, 2018

Related U.S. Application Data

(60) Provisional application No. 62/220,266, filed on Sep. 18, 2015, provisional application No. 62/254,682, filed on Nov. 12, 2015.

(51) Int. Cl.
*H04W 24/10* (2009.01)
*H04W 48/16* (2009.01)
(Continued)

(52) U.S. Cl.
CPC .......... *H04W 24/10* (2013.01); *H04W 48/16* (2013.01); *H04W 24/08* (2013.01); *H04W 36/0094* (2013.01); *H04W 88/06* (2013.01)

(58) Field of Classification Search
None
See application file for complete search history.

(56) References Cited

U.S. PATENT DOCUMENTS

| 2014/0105166 A1 | 4/2014 | Yamada et al. |
| 2015/0043560 A1 | 2/2015 | Guo et al. |

(Continued)

FOREIGN PATENT DOCUMENTS

WO  WO 2014/096532 A1  6/2014

OTHER PUBLICATIONS

LG Electronics Inc.,"WLAN measurement framework", R2-153817, 3GPP TSG-RAN WG2 #91, China, Beiging, Aug. 24-28, 2015, 5 pgs.

*Primary Examiner* — Ajay Cattungal
*Assistant Examiner* — Gautam Sharma
(74) *Attorney, Agent, or Firm* — Birch, Stewart, Kolasch & Birch, LLP

(57) ABSTRACT

A method by which a terminal reports a measurement result in a wireless communication system, and a device supporting the same are provided. The terminal can receive a plurality of trigger quantities from a network, determine a plurality of measurement report triggering subscription conditions corresponding to the received plurality of trigger quantities, and report the measurement result if all the determined plurality of measurement report triggering subscription conditions are satisfied.

13 Claims, 10 Drawing Sheets

(51) Int. Cl.
  *H04W 24/08* (2009.01)
  *H04W 36/00* (2009.01)
  *H04W 88/06* (2009.01)

(56) References Cited

U.S. PATENT DOCUMENTS

| | | |
|---|---|---|
| 2015/0195731 A1 | 7/2015 | Jung et al. |
| 2015/0271698 A1* | 9/2015 | Dalsgaard ............. H04L 5/0051 370/235 |
| 2015/0271729 A1* | 9/2015 | Sirotkin ................ H04W 48/00 370/332 |
| 2015/0319655 A1* | 11/2015 | Koskinen .............. H04W 24/10 370/331 |
| 2016/0219478 A1* | 7/2016 | Huang-Fu ......... H04W 36/0083 |
| 2017/0026929 A1* | 1/2017 | Grischy ................ H04W 24/04 |
| 2017/0048763 A1* | 2/2017 | Ke .................... H04W 36/0066 |
| 2017/0311362 A1* | 10/2017 | Hong ................... H04W 84/12 |
| 2017/0332291 A1* | 11/2017 | Sirotkin ................ H04W 24/10 |
| 2018/0049047 A1* | 2/2018 | Lin ....................... H04W 24/02 |
| 2018/0124642 A1* | 5/2018 | Phuyal ................. H04W 28/08 |
| 2018/0139144 A1* | 5/2018 | Comstock ......... H04W 28/0284 |
| 2018/0139254 A1* | 5/2018 | Oyman ................ H04L 65/605 |
| 2018/0199222 A1* | 7/2018 | Bergstrom ........... H04W 48/18 |
| 2018/0255473 A1* | 9/2018 | Kim ..................... H04W 24/10 |

\* cited by examiner (a)

(b)

METHOD AND DEVICE ALLOWING TERMINAL TO REPORT MEASUREMENT RESULT

CROSS REFERENCE TO RELATED APPLICATIONS

This application is the National Phase of PCT International Application No. PCT/KR2016/010398, filed on Sep. 19, 2016, which claims priority under 35 U.S.C. 119(e) to U.S. Provisional Application No. 62/220,266, filed on Sep. 18, 2015 and No. 62/254,682, filed on Nov. 12, 2015, all of which are hereby expressly incorporated by reference into the present application.

BACKGROUND OF THE INVENTION

Field of the Invention

The present invention relates to a wireless communication system, and more particularly, to a method for a UE to determine whether to report a measurement result based on a plurality of measurement report-triggering conditions, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

SUMMARY OF THE INVENTION

A UE may perform or stop a measurement report based on a measurement report-triggering condition. Here, if only one trigger quantity is considered for the measurement report-triggering condition, an unnecessary measurement report may be performed or a necessary measurement report may not be performed. Therefore, it is needed to newly propose a plurality of measurement report-triggering conditions based on a plurality of trigger quantities.

According to one embodiment, there is provided a method for a UE to report a measurement report in a wireless communication system. The method may include: receiving a plurality of trigger quantities from a network; determining a plurality of measurement report triggering-entering conditions corresponding to the plurality of received trigger quantities; and reporting a measurement result when all of the plurality of determined measurement report triggering-entering conditions is satisfied.

When an access point (AP) of the UE is a WLAN, the plurality of trigger quantities may include at least one of wireless channel information, load information, and backhaul information. The load information may be at least one of available admission, channel utilization, and a station count. The direction of an inequality sign of a measurement report triggering-entering condition corresponding to the channel utilization or the station count may be determined to be opposite to the direction of an inequality sign of a measurement report triggering-entering condition corresponding to the available admission. The backhaul information may be at least one of an uplink backhaul rate and a downlink backhaul rate. The wireless channel information may be a WLAN beacon RSSI.

When an AP of the UE is LTE, the plurality of trigger quantities may be wireless channel information. The wireless channel information may be at least one of a RSRP and a RSRQ.

The plurality of measurement report triggering-entering conditions may be determined based on a conventional measurement report triggering-entering condition and the trigger quantities. When the conventional measurement report triggering-entering condition is a condition in which a measurement result of a neighboring AP is better than a measurement result of a serving AP and the plurality of trigger quantities is a WLAN beacon RSSI and channel utilization, the plurality of measurement report triggering-entering conditions may be determined to be a condition in which a WLAN beacon RSSI measurement result of the neighboring AP is better than a WLAN beacon RSSI measurement result of the serving AP and a channel utilization measurement result of the neighboring AP is worse than a channel utilization measurement result of the serving AP.

The direction of an inequality sign of the measurement report triggering-entering conditions may change depending on the trigger quantities. The trigger quantities changing the direction of the inequality sign may be set by the network.

The plurality of trigger quantities may include a threshold of the plurality of trigger quantities. The plurality of measurement report triggering-entering condition may be determined to compare a measurement result of the plurality of trigger quantities with the threshold of the plurality of trigger quantities.

The method may further include determining, by the UE, a plurality of measurement report triggering-leaving conditions corresponding to the plurality of received trigger quantities; and stopping reporting the measurement result when at least one of the plurality of determined measurement report triggering-leaving conditions is satisfied.

According to another embodiment, there is provided a UE for reporting a measurement result in a wireless communication system. The UE may include: a memory; a transceiver; and a processor to connect the memory and the transceiver, wherein the processor may be configured to: control the transceiver to receive a plurality of trigger quantities from a network; determine a plurality of measurement report triggering-entering conditions corresponding to the plurality of received trigger quantities; and report a measurement result when all of the plurality of determined measurement report triggering-entering conditions is satisfied.

It is possible to prevent an unnecessary measurement result report from being performed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
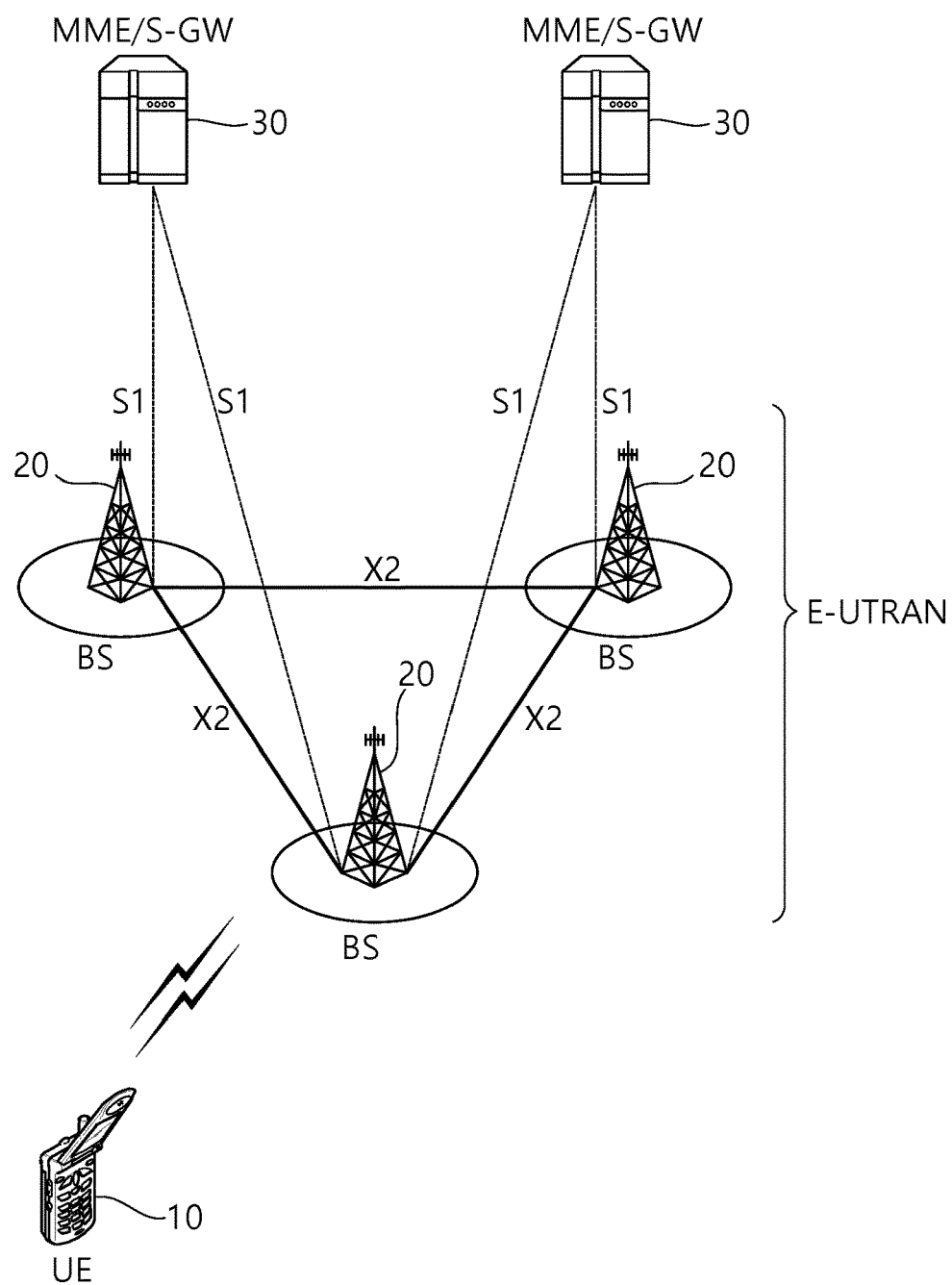
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
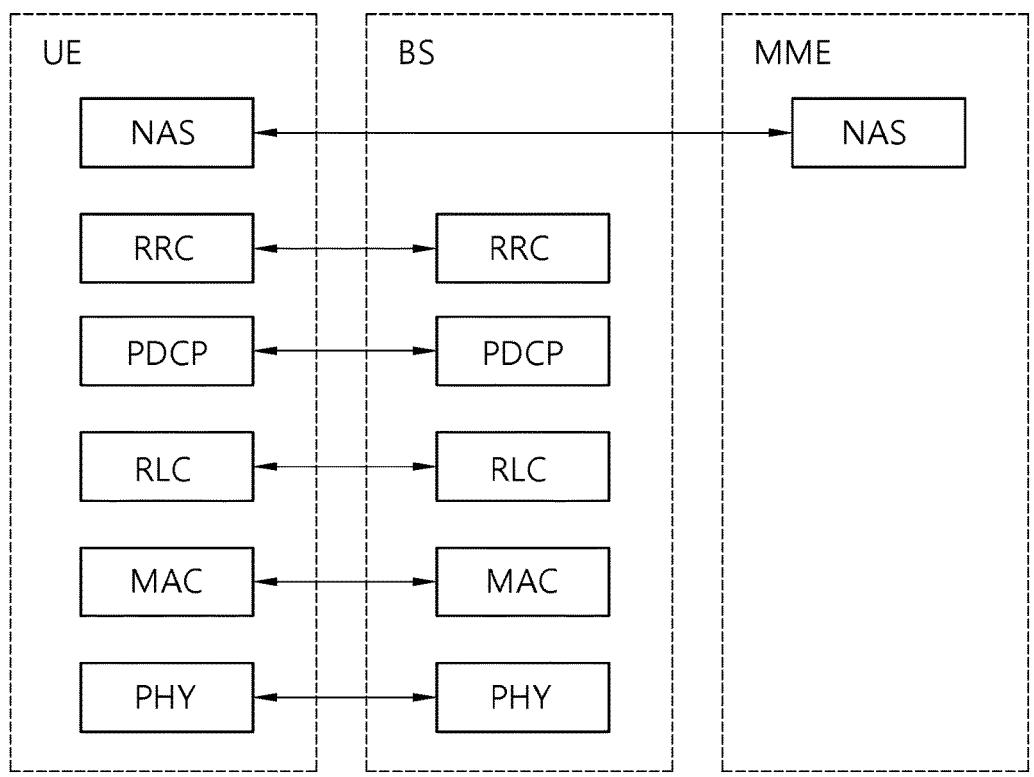
FIG. 2 shows a control plane of a radio interface protocol of an LTE system.
Figure 3:
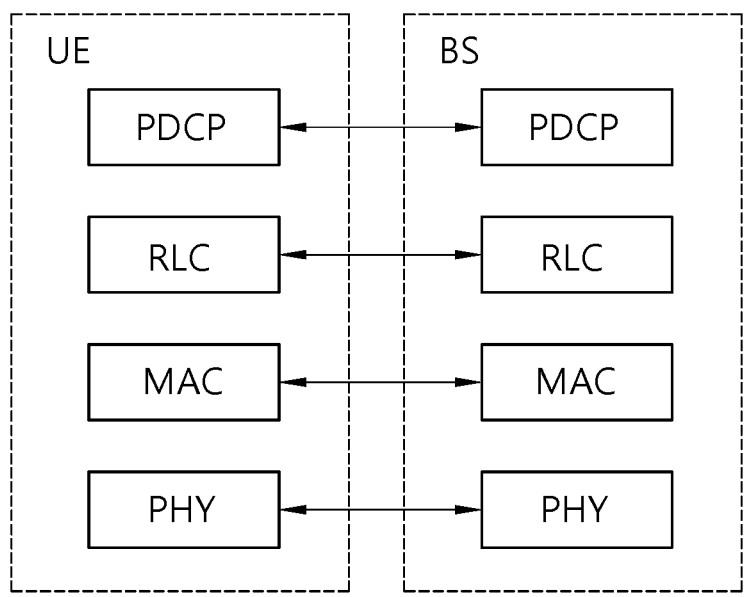
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. Then the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
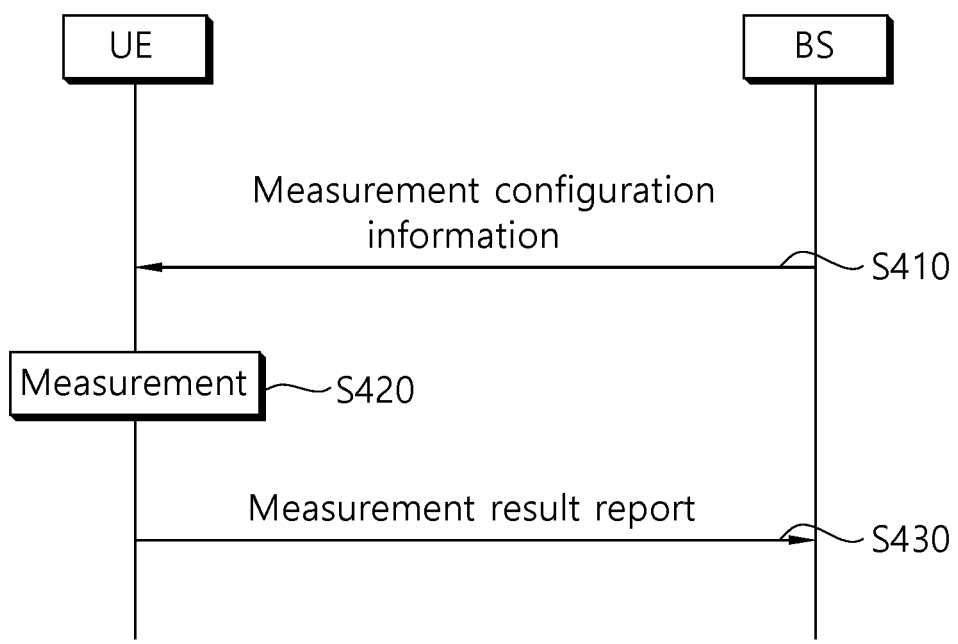
FIG. 4 shows a conventional method of performing measurement.

FIG. 4 shows a conventional method of performing measurement.

A UE receives measurement configuration information from a BS (S410). A message including the measurement configuration information is referred to as a measurement configuration message. The UE performs measurement based on the measurement configuration information (S420). If a measurement result satisfies a reporting condition included in the measurement configuration information, the UE reports the measurement result to the BS (S430). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighboring becomes offset better than PCell/PSCell |
| Event A4 | Neighboring becomes better than threshold |
| Event A5 | PCell/PSCell becomes worse than threshold1 and neighboring becomes better than threshold2 |
| Event A6 | Neighboring becomes offset better than SCell |
| Event B1 | Inter RAT neighboring becomes better than threshold |
| Event B2 | PCell becomes worse than threshold1 and inter RAT neighboring becomes better than threshold2 |
| Event C1 | CSI-RS resource becomes better than threshold |
| Event C2 | CSI-RS resource becomes offset better than reference CSI-RS resource |

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Hereinafter, Event-Triggering Conditions for Measurement Reporting are Described in Detail.

Ten types of event-triggering conditions are defined for measurement reporting (see Table 1), and each event-triggering condition includes an entering condition and a leaving condition. A UE that satisfies an entering condition of an event from a BS may perform measurement reporting to the BS. When the UE performing measurement reporting satisfies a leaving condition of the event, the UE may stop measurement reporting to the BS. Hereinafter, an entering condition and a leaving condition of each event are illustrated.

1. Event A1 (Serving becomes better than threshold)
   (1) Event A1-1 entering condition: $Ms-Hys>Thresh$
   (2) Event A1-2 leaving condition: $Ms+Hys<Thresh$
2. Event A2 (Serving becomes worse than threshold)
   (1) Event A2-1 entering condition: $Ms+Hys<Thresh$
   (2) Event A2-2 leaving condition: $Ms-Hys>Thresh$ A UE triggers an event based on a measurement result Ms of a serving cell. After applying each parameter, event A1 is triggered when the measurement result Ms of the serving cell is better than the threshold of event A1, while event A2 is triggered when the measurement result Ms of the serving cell is worse than the threshold of event A2.

3. Event A3 (Neighboring becomes offset better than PCell/PSCell)
   (1) Event A3-1 entering condition: $Mn+Ofn+Ocn-Hys>Mp+Ofp+Ocp+Off$
   (2) Event A3-2 leaving condition: $Mn+Ofn+Ocn+Hys<Mp+Ofp+Ocp+Off$
4. Event A4 (Neighboring becomes better than threshold)
   (1) Event A4-1 entering condition: $Mn+Ofn+Ocn-Hys>Thresh$
   (2) Event A4-2 leaving condition: $Mn+Ofn+Ocn+Hys<Thresh$ A UE triggers an event based on a measurement result Mp of a serving cell and a measurement result Mn of a neighboring cell. After applying each parameter, event A3 is triggered when the measurement result Mn of the neighboring cell is better than the offset of event A3, while event A4 is triggered when the measurement result Mn of the neighboring cell is better than the threshold of event A4.

5. Event A5 (PCell/PSCell becomes worse than threshold 1 and neighboring becomes better than threshold 2)
   (1) Event A5-1 entering condition: $Mp+Hys<Thresh1$
   (2) Event A5-2 entering condition: $Mn+Ofn+Ocn-Hys>Thresh2$
   (3) Event A5-3 leaving condition: $Mp-Hys>Thresh1$
   (4) Event A5-4 leaving condition: $Mn+Ofn+Ocn+Hys<Thresh2$ A UE triggers an event based on a measurement result Mp of a PCell/PSCell and a measurement result Mn of a neighboring cell. After applying each parameter, event A5 is triggered when the measurement result Mp of the PCell/PSCell is worse than threshold 1 of event A5 and the measurement result Mn of the neighboring cell is better than threshold 2 of event A5.

6. Event A6 (Neighboring becomes offset better than SCell)
   (1) Event A6-1 entering condition: $Mn+Ocn-Hys>Ms+Ocs+Off$
   (2) Event A6-2 leaving condition: $Mn+Ocn+Hys<Ms+Ocs+Off$ A UE triggers an event based on a measurement result Ms of a serving cell and a measurement result Mn of a neighboring cell. After applying each parameter, event A6 is triggered when the measurement result Mn of the neighboring cell is better than the offset of event A6.

7. Event B1 (Inter RAT neighboring becomes better than threshold)
   (1) Event B1-1 entering condition: $Mn+Ofn-Hys>Thresh$
   (2) Event B1-2 leaving condition: $Mn+Ofn+Hys<Thresh$ A UE triggers an event based on a measurement result Mn of a neighboring cell. After applying each parameter, event B1 is triggered when the measurement result Mn of the neighboring cell is better than the threshold of event B1.

8. Event B2 (PCell becomes worse than threshold 1 and inter RAT neighboring becomes better than threshold 2)
   (1) Event B2-1 entering condition: $Mp+Hys<Thresh1$
   (2) Event B2-2 entering condition: $Mn+Ofn-Hys>Thresh2$
   (3) Event B2-3 leaving condition: $Mp-Hys>Thresh1$
   (4) Event B2-4 leaving condition: $Mn+Ofn+Hys<Thresh2$ A UE triggers an event based on a measurement result Mp of a PCell/PSCell and a measurement result Mn of a neighboring cell. After applying each parameter, event B2 is triggered when the measurement result Mp of the PCell/PSCell is worse than threshold 1 of event B2 and the measurement result Mn of the neighboring cell is better than threshold 2 of event B2.

9. Event C1 (CSI-RS resource becomes better than threshold)
   (1) Event C1-1 entering condition: $Mcr+Ocr-Hys>Thresh$
   (2) Event C1-2 leaving condition: $Mcr+Ocr+Hys<Thresh$ A UE triggers an event based on a CSI-RS measurement result Mcr. After applying each parameter, event C1 is triggered when the CSI-RS measurement result Mcr is better than the threshold of event C1.

10. Event C2 (CSI-RS resource becomes offset better than reference CSI-RS resource)
    (1) Event C2-1 entering condition: $Mcr+Ocr-Hys>Mref+Oref+Off$
    (2) Event C2-2 leaving condition: $Mcr+Ocr+Hys<Mref+Oref+Off$ A UE triggers an event based on a CSI-RS measurement result Mcr and a measurement result Mref of a reference CSI-RS resource. After applying each parameter, event C2 is triggered when the measurement result Mref of the reference CSI-RS resource is better than the offset of event C2.

Parameters defined for each event are as follows.

Ms is a measurement result of a serving cell, which does not consider any offset.

Mp is a measurement result of a PCell/PSCell, which does not consider any offset.

Mn is a measurement result of a neighboring cell, which does not consider any offset.

Mcr is a measurement result of a CSI-RS resource, which does not consider any offset.

Hys is a hysteresis parameter for each event (that is, a hysteresis defined in a reporting configuration EUTRA (reportConfigEUTRA) for each event).

Ofn is a frequency-specific offset for a frequency of a neighboring cell (that is, an offset frequency defined in a measurement object EUTRA (measObjectEUTRA) corresponding to a frequency of a neighboring cell).

Ocs is a cell-specific offset for a serving cell (that is, a cell individual offset (cellIndividualOffset) defined in a measurement object EUTRA corresponding to a frequency of a serving cell). If no Ocs is set for a serving cell, the offset is set to 0.

Ocn is a cell-specific offset for a neighboring cell (that is, a cell individual offset defined in a measurement object EUTRA corresponding to a frequency of a neighboring cell). If no Ocn is set for a neighboring cell, the offset is set to 0.

Ofp is a frequency-specific offset for a frequency of a PCell/PSCell (that is, an offset frequency defined in a measurement object EUTRA corresponding to a frequency of a PCell/PSCell).

Ocp is a cell-specific offset for a PCell/PSCell (that is, a cell individual offset defined in a measurement object EUTRA corresponding to a frequency of a PCell/PSCell). If no Ocp is set for a PCell/PSCell, the offset is set to 0.

Ocr is a CSI-RS-specific offset (that is, a CSI-RS individual offset (csi-RS-IndividualOffset) defined in a measurement object EUTRA corresponding to a frequency of a CSI-RS resource). If no Ocr is set for a CSI-RS resource, the offset is set to 0.

Mref is a measurement result of a reference CSI-RS resource (that is, a measurement result of a reference CSI-RS resource defined in a reporting configuration EUTRA for event C2), which does not consider any offset.

Oref is a CSI-RS-specific offset for a reference CSI-RS resource (that is, a CSI-RS individual offset defined in a measurement object EUTRA corresponding to a frequency of a reference CSI-RS resource). If no Oref is set for a CSI-RS resource, the offset is set to 0.

Thresh is a threshold parameter for each event (that is, a threshold defined in a reporting configuration EUTRA for each event). Different threshold parameters may be used respectively for events A1 to C2.

Off is an offset parameter for each event (that is, an offset defined in a reporting configuration EUTRA for each event). Different offset parameters may be used respectively for events A3, A6, and C2.

A BS may report or may not report a serving-cell quality threshold (s-Measure). When the BS reports the quality threshold of a serving cell, a UE performs the measurement of a neighboring cell and the evaluation of an event (determining whether an event-triggering condition is satisfied, also referred to as the evaluation of reporting criteria) when the quality (RSRP) of the serving cell is lower than the quality threshold of the serving cell. When the BS does not report the quality threshold of the serving cell, the UE performs the measurement of the neighboring cell and the evaluation of an event without depending on the quality (RSRP) of serving cell.

Figure 5:
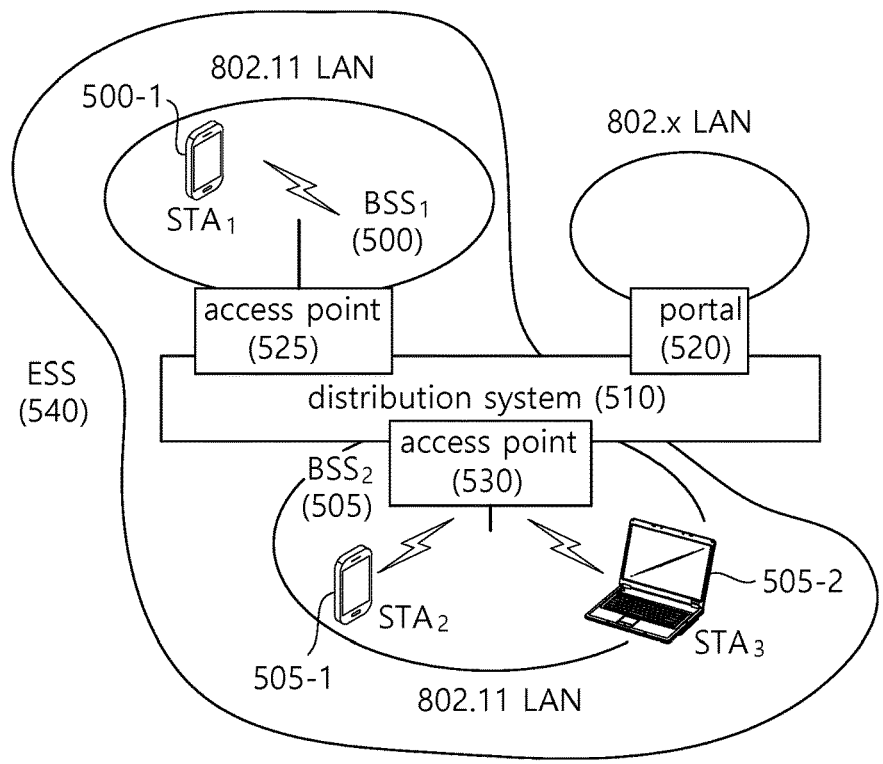
FIG. 5 shows the structure of a wireless local area network (WLAN).
Figure 5:
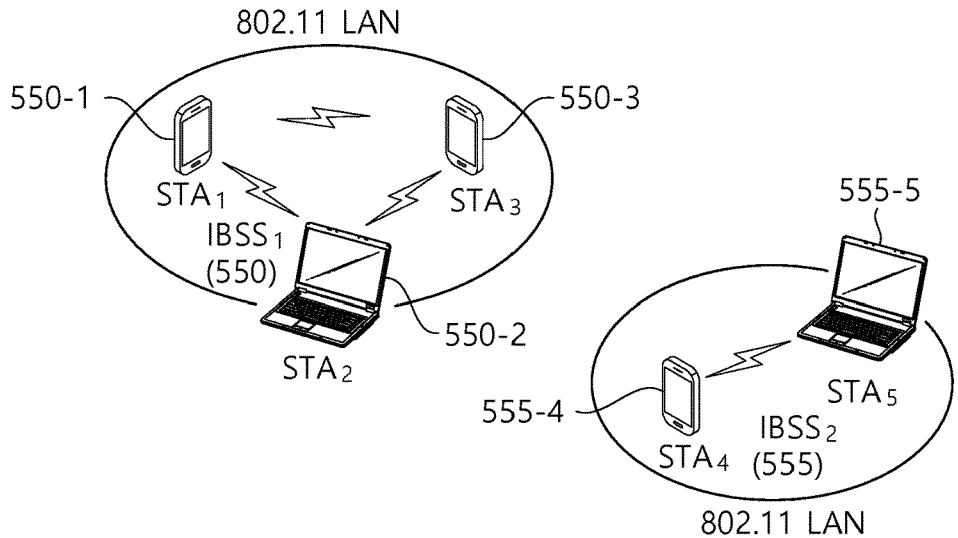

FIG. 5 shows the structure of a wireless local area network (WLAN). FIG. 5(a) shows the structure of an infrastructure network of Institute of Electrical and Electronics Engineers (IEEE) 802.11. FIG. 5(b) shows an independent BSS.

Referring the FIG. 5(a), a WLAN system may include one or more basic service sets (BSSs) 500 and 505. The BSSs 500 and 505 are a set of an access point (AP) and a station (STA), such as an AP 525 and STA1 500-1, which are successfully synchronized to communicate with each other, and are not a concept indicating a specific region. The BSS 505 may include one AP 530 and one or more STAs 505-1 and 505-2 that may be connected to the AP 530.

An infrastructure BSS may include at least one STA, APs 525 and 530 providing a distribution service, and a distribution system (DS) 510 connecting a plurality of APs.

The distribution system 510 may configure an extended service set (ESS) 540 by connecting a plurality of BSSs 500 and 505. The ESS 540 may be used as a term indicating one network configured by connecting one or more APs 525 or 530 through the distribution system 510. APs included in one ESS 540 may have the same service set identification (SSID).

A portal 520 may serve as a bridge that connects the WLAN (IEEE 802.11) and another network (for example, 802.X).

In the infrastructure network illustrated in the FIG. 5(a), a network between the APs 525 and 530 and a network between the APs 525 and 530 and the STAs 500-1, 505-1, and 505-2 may be configured. However, it is possible to configure a network between STAs in the absence of the APs 525 and 530 to perform communication. A network configured between STAs in the absence of the APs 525 and 530 to perform communication is defined as an ad hoc network or independent basic service set (BSS).

Referring to FIG. 5(b), an independent BSS (IBSS) is a BSS that operates in an ad hoc mode. The IBSS includes no AP and thus has no centralized management entity that performs a management function at the center. That is, in the IBSS, STAs 550-1, 550-2, 550-3, 555-4, and 555-5 are managed in a distributed manner. In the IBSS, all STAs 550-1, 550-2, 550-3, 555-4, and 555-5 may be mobile STAs. Further, the STAs are not allowed to access the DS and thus establish a self-contained network.

An STA is a functional medium including medium access control (MAC) and a physical layer interface for a radio medium according to IEEE 802.11 specifications and may be used to broadly mean both an AP and a non-AP STA.

An STA may also be referred to as various names, such as a mobile UE, a wireless device, a wireless transmit/receive unit (WTRU), user equipment (UE), a mobile station (MS), a mobile subscriber unit, or simply a user.

Hereinafter, Interworking Between a 3GPP Access Network and Other Access Network Will be Described.

A 3GPP introduces interworking with a non-3GPP access network (e.g. WLAN) from Rel-8 to find accessible access network, and regulates ANDSF (Access Network Discovery and Selection Functions) for selection. An ANDSF transfers accessible access network finding information (e.g. WLAN, WiMAX location information and the like), Inter-System Mobility Policies (ISMP) capable of reflecting policies of a business, and an Inter-System Routing Policy (ISRP). The UE may determine whether to transmit certain IP traffic through a certain access network. An ISMP may include a network selection rule with respect to selection of one active access network connection (e.g., WLAN or 3GPP) by the UE. An ISRP may include a network selection rule with respect to selection of at least one potential active access network connection (e.g., both of WLAN and 3GPP) by the UE. The ISRP includes Multiple Access PDN Connectivity (MAPCON), IP Flow Mobility (IFOM), and non-seamless WLAN offloading. For dynamic provision between the ANDSF and the UE, Open Mobile Alliance Device Management (OMA DM) or the like are used.

The MAPCON simultaneously configures and maintains a plurality of packet data networks (multiple PDN connectivity) through a 3GPP access network and a non-3GPP access network and regulates a technology capable of performing seamless traffic offloading in the whole active PDN connection unit. To this end, an ANDSF server provides APN (Access Point Name) information to perform offloading, inter-access network priority (routing rule), Time of Day to which offloading method is applied, and access network (Validity Area) information to be offloaded.

The IFOM supports mobility and seamless offloading of an IP flow unit of flexible subdivided unit as compared with the MAPCON. A technical characteristic of the IFOM allows a UE to access through different access network when the UE is connected to a packet data network using an access point name (APN). Mobility and a unit of offloading may be moved in a specific service IP traffic flow unit which is not a packet data network (PDN), the technical characteristic of the IFOM has flexibility of providing a service. To this end, an ANDSF server provides IP flow information to perform offloading, priority (routing rule) between access networks, Time of Day to which an offloading method is applied, and Validity Area where offloading is performed.

The non-seamless WLAN offloading refers to a technology which changes a certain path of a specific IP traffic to a WLAN and completely offloads traffic without passing through an EPC. Since the non-seamless WLAN offloading is not anchored in P-GW for supporting mobility, offloaded IP traffic may not continuously moved to a 3GPP access network. To this end, the ANDSF server provides information similar to information to be provided for performing an IFOM.

Figure 6:
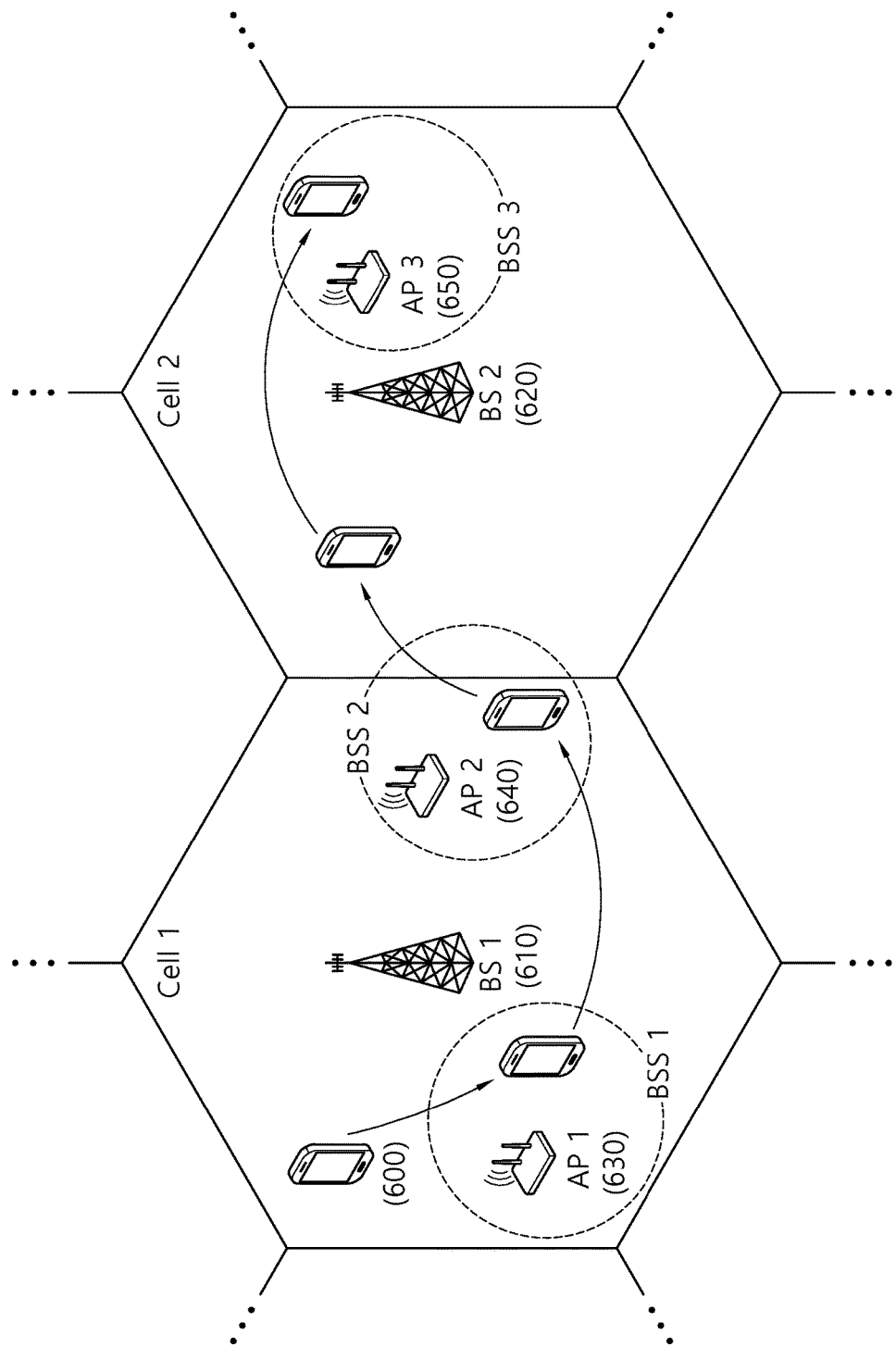
FIG. 6 shows an example of an environment where a 3GPP access network and a WLAN access network coexist.

FIG. 6 shows an example of an environment where a 3GPP access network and a WLAN access network coexist.

Referring to FIG. 6, a cell 1 centering a base station 1 (610) and a cell 2 centering a base station 2 (620) are deployed as a 3GPP access network. Further, a Basic Service Set (BSS) 1 as the WLAN access network centering an Access Point (AP) 1 (630) located in a cell 1 and a BSS2 centering AP2 (640) and deployed. A BSS3 centering an AP3 (650) located in a cell 2 is deployed. Coverage of the cell is shown with a solid line, and coverage of BSS is shown with a dotted line.

It is assumed that the UE 600 is configured to perform communication through a 3GPP access network and a WLAN access network. In this case, the UE 600 may refer to a station.

First, the UE 600 may establish connection with a BS1 (610) in a cell 1 to perform traffic through a 3GPP access network.

The UE 600 may enters coverage of BSS1 while moving into coverage of cell 1. In this case, the UE 600 may connect with a WLAN access network by performing association and authentication procedures with an AP1 (630) of BSS1. Accordingly, the UE 600 may process traffic through a 3GPP access network and a WLAN access network. Meanwhile, the UE 600 moves and is separated from the coverage BSS1, connection with a WLAN access network may be terminated.

The UE 600 continuously move into the coverage of cell 1 and move around a boundary between cell 1 and cell 2, and enters coverage of BSS2 to find BSS2 through scanning. In this case, the UE 600 may connect with the WLAN access network by performing association and authentication procedures of AP2 (640) of the BSS2. Meanwhile, since the UE 600 in the coverage of the BSS2 is located at a boundary between the cell 1 and the cell 2, service quality through the 3GPP access network may not be excellent. In this case, the UE 600 may operate to mainly process traffic through a WLAN access network.

When the UE 600 moves and is separated from the coverage of the BSS2 and enters a center of the cell 2, the UE 600 may terminate connection with the WLAN access network and may process traffic through a 3GPP access network based on the cell 2.

The UE 600 may enter coverage of the BSS3 while moving into the coverage of cell 2 to find the BSS1 through scanning. In this case, the UE 600 may connect with the WLAN access network by association and authentication procedures of an AP3 (650) of the BSS3. Accordingly, the UE 600 may process the traffic through the 3GPP access network and the WLAN access network.

As illustrated in an example of FIG. 6, in a wireless communication environment where a 3GPP access network and a non-3GPP access network coexist, the UE may adaptively process traffic through a 3GPP access network and/or a non-3GPP access network.

As policies for interworking between the 3GPP access network and a non-3GPP access network, the above ANDSF may be configured. If the ANDSF is configured, the UE may process traffic of the 3GPP access network through a non-3GPP access network or a 3GPP access network.

Meanwhile, interworking policies except for the ANDSF may be configured. In order to easily use the WLAN except for ANDSF in a current 3GPP network, interworking policies reflecting measurement parameters such as load and signal quality of the 3GPP access and/or the WLAN access network are defined. Hereinafter, the policy refers to an RAN policy. Further, a traffic steering rule according to an RAN policy refers to an RAN rule.

The RAN rule may be provided to the UE together with at least one RAN rule parameter for evaluating traffic steering according to the RAN rule. The RAN rule and the RAN rule parameter may be configured as follows.

1. The RAN rule may indicate whether traffic steering to a WLAN is allowed.

2. The RAN rule may indicate a traffic steering estimation condition being a condition allowed or required by traffic steering performing to the WLAN access network from the 3GPP access network. The condition according to the RAN rule may involve estimation of measurement results with respect to an LTE cell. Further, the condition according to the RAN rule may involve estimation of measurement results with respect to the WLAN. The estimation may be comparison of the measurement result with an RAN rule parameter (e.g., a measurement threshold value and the like) indicated in the traffic steering information. The following illustrates an example of a traffic steering estimation condition considered by the UE.

(1) Traffic Steering Condition to a WLAN Access Network
  RSRP measurement value (measured_RSRP)<low RSRP threshold value (Threshold_RSRP_low)
  3GPP load measurement value (measured_3GPPLoad)> high 3GPP load threshold value (Threshold_ 3GPPLoad_High)
  WLAN load measurement value (measured_WLAN-Load)<low WLAN load threshold value (Threshold_ WLANLoad_low)
  WLAN signal strength measurement value (measured_W-LANsignal)>high WLAN signal strength threshold value (Threshold_WLANsignal_high)
(2) Traffic Steering Condition to 3GPP Access Network
  RSRP measurement value (measured_RSRP)>high RSRP threshold value (Threshold_RSRP— high)
  3GPP load measurement value (measured_3GPPLoad) <low 3GPP load threshold value (Threshold_ 3GPPLoad_High)
  WLAN load measurement value (measured_WLAN-Load)>high WLAN load threshold value (Threshold_ WLANLoad_high)
  WLAN signal strength measurement value (measured_W-LANsignal)<low WLAN signal strength threshold value (Threshold_WLANsignal_low)

Meanwhile, the estimation condition may be configured while the at least one condition is coupled with each other using and/or. For example, the traffic steering estimation condition implemented by coupling the at least one condition may be implemented as follows.

Traffic steering estimation condition for traffic steering to WLAN:(measured_RSRP<Threshold_RSRP_low) and (measured_WLANLoad<Threshold_WLAN- Load_low)and (measured_WLANsignal>Threshold_WLANsignal_ high)
  Traffic steering estimation condition for traffic steering to 3GPP: (measured_RSRP>Threshold_RSRP_low) or (measured_WLANLoad>Threshold_WLANLoad_high)or (measured_WLANsignal<Threshold_WLAN- signal_ low)

3. The RAN rule may indicate a condition where traffic steering performing to a 3GPP access network from the WLAN access network is allowed or required.

4. The RAN rule may indicate an object WLAN access network where performing the traffic steering from the 3GPP access network is allowed or required.

5. The RAN rule may indicate traffic in which routing is allowed to the WLAN access network. Alternatively, the RAN rule may indicate at least one traffic where routing to the WLAN access network is allowed, that is, which may be served by the 3GPP access network.

Meanwhile, the ANDSF configured in the UE may include a legacy ANDSF and/or an enhanced ANDSF.

The legacy ANDSF may be defined as an ANDSF which does not include ANDSF management object (MO) such as corresponding parameters defined in the RAN rule parameter. Unlike the legacy ANDSF, the enhanced ANDSF may be defined as an ANDSF including an ANDSF MO such as corresponding parameters defined in a RAN rule parameter.

Figure 7:
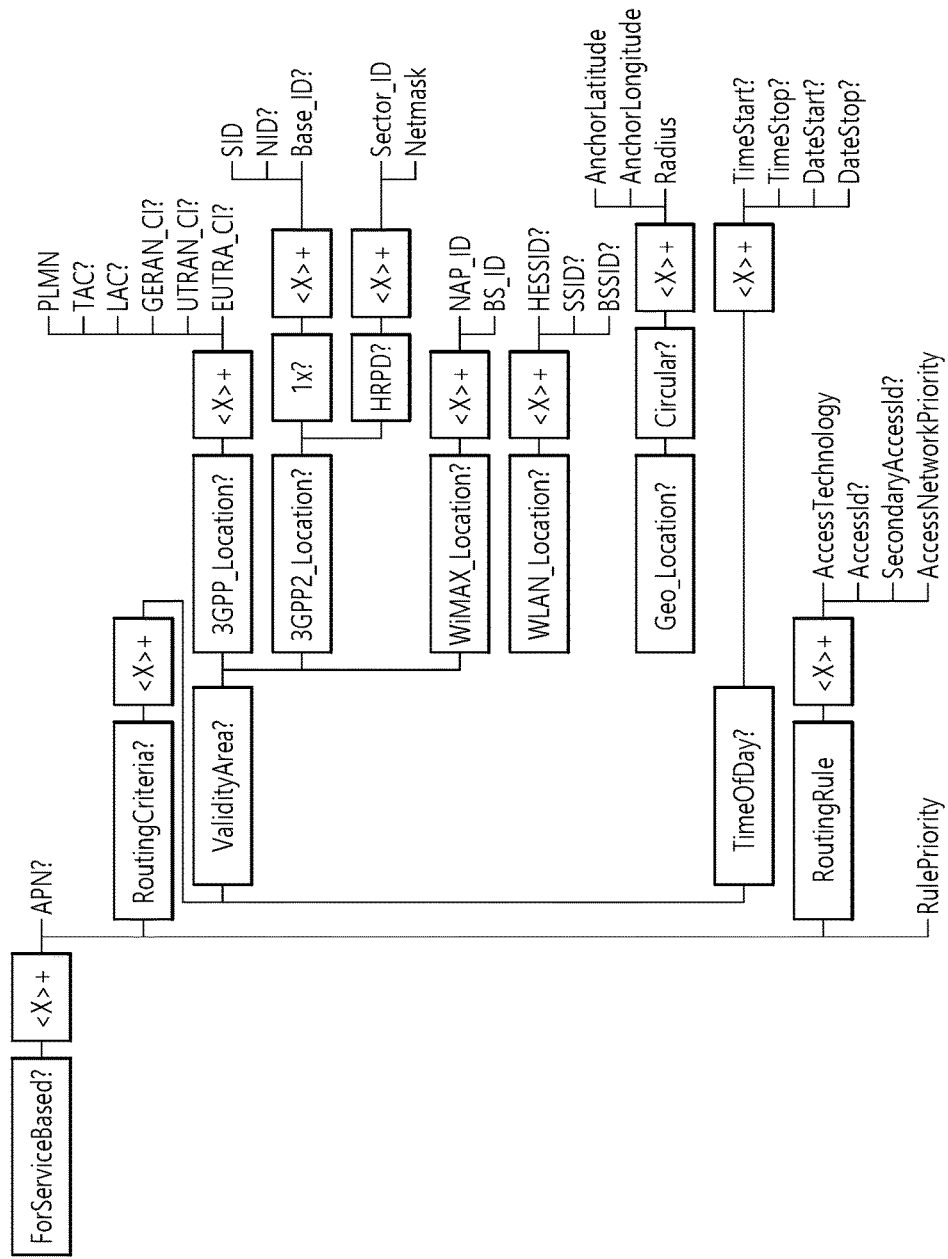
FIG. 7 shows an example of a legacy ANDSF with respect to an MAPCON.
Figure 8:
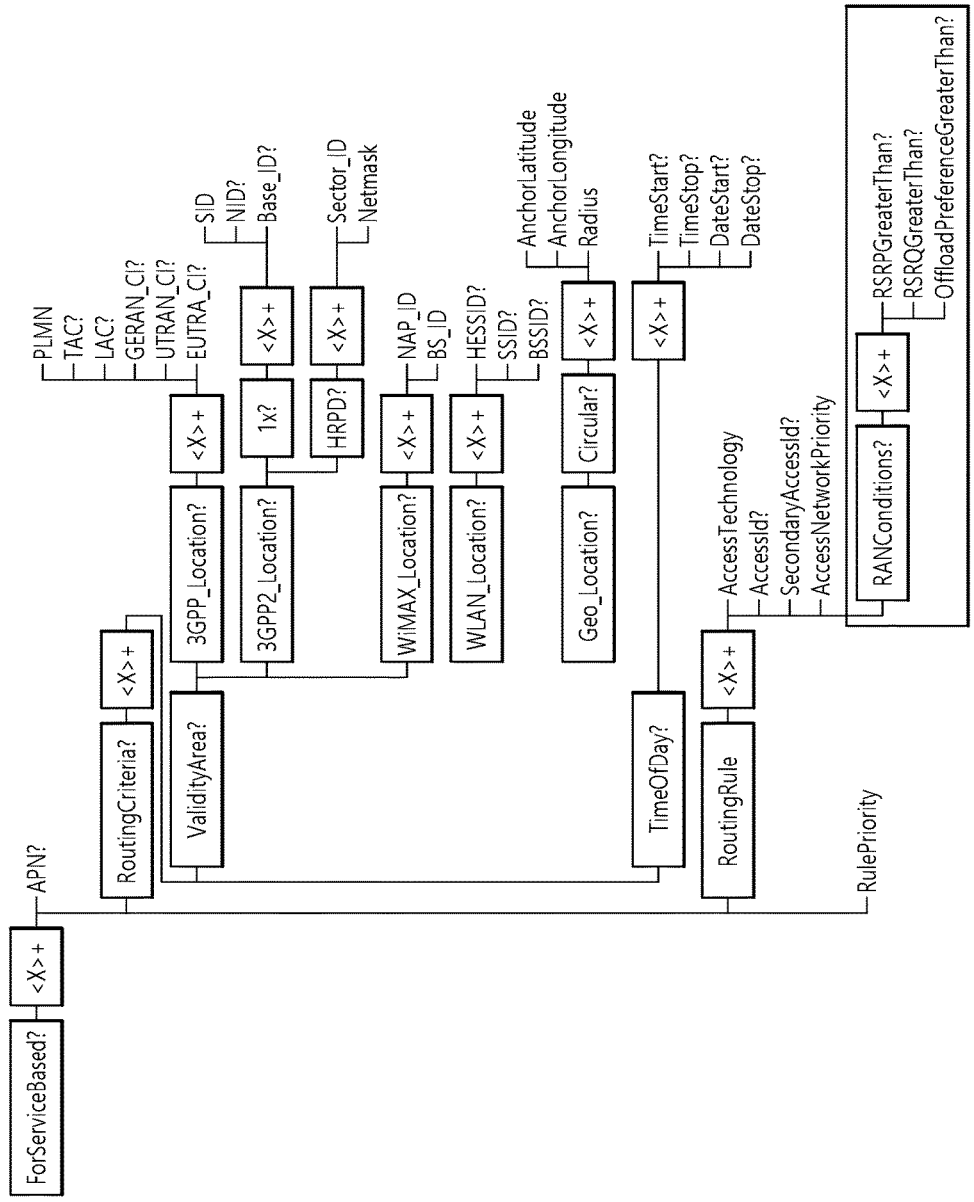
FIG. 8 shows an example of an enhanced ANDSF with respect to the MAPCON.

FIG. 7 shows an example of a legacy ANDSF with respect to an MAPCON, and FIG. 8 shows an example of an enhanced ANDSF with respect to the MAPCON.

Referring to FIG. 7, the legacy ANDSF does not include an RAN rule parameter such as RSRP and a WLAN signal level as an ANDSF MO.

Meanwhile, referring to FIG. 8, the enhanced ANDSF may include RSRP, RSRQ, and an offload preference as the ANDSF MO. Further, the ANDSF may include a WLAN signal level (e.g. RSSI, RSCP), a WLAN load level, a WLAN backhaul data rate, and a WLAN backhaul load.

The enhanced ANDSF may specify the traffic steering evaluation condition associated with each ANDSF MO. The traffic steering evaluation condition specified by the enhanced ANDSF may be configured similar to the traffic steering evaluation condition associated with the configured RAN rule parameter configured by the RAN rule. A detailed description thereof will be omitted.

Hereinafter, WLAN Measurement is Described.

A UE supporting LTE-WLAN aggregation (LWA) may be set by an E-UTRAN to perform WLAN measurement. A WLAN measurement object may be set using a WLAN identifier (BSS ID, HESS ID or SS ID), a WLAN channel number, and a WLAN band. A WLAN measurement report may be triggered using an RSSI. The WLAN measurement report may include an RSSI, channel utilization, a station count, admission capacity, a backhaul rate, and a WLAN identifier. WLAN measurement may be set to support at least one of LWA activation, inter WLAN mobility set mobility, and LWA deactivation.

As described above, a UE may perform or stop a measurement report based on a measurement report-triggering condition. For example, in event A1, when a value obtained by applying the hysteresis to the measurement result of the serving cell is greater than the threshold, the UE may perform a measurement result report. When the value obtained by applying the hysteresis to the measurement result of the serving cell is less than the threshold, the UE may stop a measurement result report. For example, in event A3, the UE may compare the measurement result of the serving cell with the measurement result of the neighboring cell and may determine whether to perform or stop a measurement result repot. Here, only one trigger quantity is considered for the current measurement report-triggering condition. That is, only one trigger quantity is used to assess a measurement report triggering-entering condition or a measurement report triggering-leaving condition. In some cases, however, a measurement report-triggering condition based on only one trigger quantity may trigger a large number of measurement reports or may prevent a necessary measurement report from being performed. Further, when a trigger quantity is limited to a particular WLAN metric, such as RSSI or channel utilization, the UE may not report a WLAN measurement report even though other measured metrics are very poor. Therefore, to solve the foregoing problem, it may be necessary to propose a measurement report-triggering condition based on a plurality of a plurality of trigger quantities. Hereinafter, a method for a UE to report a measurement result and a device supporting the same according to an embodiment of the present invention are described.

(1) The UE may determine whether to report a measurement result to a network based on the measurement result. Also, the UE may determine whether to stop reporting a measurement result to the network based on the measurement result. To this end, the UE may determine whether a measurement report-triggering condition is satisfied. The measurement report-triggering condition may include a measurement report triggering-entering condition and a measurement report triggering-leaving condition.

A plurality of measurement report-triggering conditions may be newly defined to prevent unnecessary measurement reports from being repeated or to prevent necessary measurement reports from not being performed. When a plurality of measurement report triggering-entering conditions is satisfied, the UE may report a measurement result to the network. Also, when at least one of a plurality of measurement report triggering-leaving conditions is satisfied, the UE may stop reporting a measurement result.

(2) The plurality of measurement report-triggering conditions may be determined based on a trigger quantity. The trigger quantity may be set by the network. A plurality of trigger quantities may be set. The measurement report-triggering conditions may be defined by one or more inequalities. The measurement report-triggering conditions determined based on the trigger quantity may be newly defined using the existing measurement report-triggering condition.

For example, when a measurement quantity is set to WLAN beacon RSSI, an existing measurement report-triggering event A1 (Serving becomes better than threshold) may be newly defined as an event of comparing the result of measuring WLAN beacon RSSI with the threshold of WLAN beacon RSSI.

For example, when a measurement quantity is set to WLAN beacon RSSI and channel utilization, an existing measurement report triggering event A2 (Serving becomes worse than threshold) may be newly defined as an event of comparing the result of measuring WLAN beacon RSSI with the threshold of the WLAN beacon RSSI and comparing the result of measuring channel utilization with the threshold of channel utilization.

(3) For a particular trigger quantity, the UE may use the converse of a conventionally set inequality. That is, a measurement report-triggering condition may be set according to the trigger quantity, and the direction of the inequality sign of the measurement report-triggering condition may be set according to the trigger quantity.

For example, suppose that an existing measurement report triggering-entering condition is 'A is greater than B'. In this case, a measurement report triggering-entering condition for the particular trigger quantity may be 'A is less than B.' A measurement report triggering-entering condition for the remaining trigger quantities may be 'A is greater than B'.

For example, suppose that an existing measurement report triggering-leaving condition is 'C is less than D'. In this case, a measurement report triggering-leaving condition for the particular trigger quantity may be 'C is less than D.' A measurement report triggering-leaving condition for the remaining trigger quantities may be 'C is greater than D'.

The particular trigger quantity may be signaled by the network. Alternatively, the particular trigger quantity may be preset by the UE. For example, the smaller channel utilization as one WLAN measurement index is, the better the WLAN state is. Therefore, when channel utilization is set as a trigger quantity, the direction of the inequality sign of a measurement report-triggering condition corresponding to channel utilization may be determined to be opposite to that of the existing measurement report-triggering condition.

(4) The number of trigger quantities may be set by the network. The UE may not consider a trigger quantity not set by the network. The UE may not consider a trigger quantity, the threshold of which is not provided.

(5) The existing measurement report condition may be events A1 to A6, event B1, event B2, event C1, event C2, or an event for a WLAN measurement report. The existing measurement report condition may be newly defined based on the trigger quantity. For example, when an AP is LTE, the trigger quantity may be at least one of RSRP and RSRQ. When the AP is a WLAN, the trigger quantity may be at least one of WLAN Beacon RSSI, channel utilization in BSS load, a UL backhaul rate, a DL backhaul rate, a station count, and available admission.

(6) When a serving AP and a target AP employ different RATs, a trigger quantity set for the serving AP and a trigger quantity set for the target AP may be different. For example, when the serving AP is LTE and the target AP is a WLAN, a measurement quantity set for the serving AP may be at least one of RSRP and RSRQ and a measurement quantity set for the target AP may be at least one of a WLAN Beacon RSSI, channel utilization, a UL backhaul rate, a DL backhaul rate, a station count, and available admission.

Hereinafter, an example of a method for a UE to perform a measurement report based on a trigger quantity according to an embodiment of the present invention will be described.

<First Embodiment>

(1) In the first embodiment, it is assumed that a measurement report-triggering condition is as follows.

Measurement report-triggering condition: all trigger quantities set by a network for a serving AP that are worse a first threshold, and all trigger quantities set by the network for a target AP that are better than a second threshold.

The measurement report-triggering condition may be divided into two inequalities.

Inequality 1: Measurement result of serving AP<First threshold

Inequality 2: Measurement result of target AP>Second threshold (2) Suppose that one threshold for one trigger quantity is set for the serving AP. The one trigger quantity may be RSRP. Suppose that three thresholds for three trigger quantities are set for the target AP. The three trigger quantities may be a WLAN beacon RSSI, channel utilization, and a backhaul rate.

(3) Then, inequality 1 and inequality 2 may be extended as follows. When all of inequality 1a, inequality 2a, inequality 2b, and inequality 2c are satisfied, a UE may report a measurement result to the network. However, when at least one of inequality 1a, inequality 2a, inequality 2b, and inequality 2c is not satisfied, the UE may stop reporting a measurement result.

Inequality 1a: RSRP measurement result<RSRP threshold

Inequality 2a: WLAN beacon RSSI measurement result>WLAN beacon RSSI threshold

Inequality 2b: Channel utilization measurement result<Channel utilization threshold Inequality 2c: Backhaul rate measurement result>Backhaul rate threshold An inequality sign for channel utilization may be opposite to the inequality sign of inequality 2. That is, the existing inequality 2 is 'Measurement result of target AP>Second threshold', while inequality 2b corresponding to the trigger quantity is 'Channel utilization measurement result<Channel utilization threshold', where the direction of the inequality sign is changed from '>' to '<'. Regarding channel utilization, the lower channel utilization an AP has, the better the channel state is. Also, for a station count, the opposite inequality sign to the existing inequality sign may be used. A trigger quantity for which an opposite inequality sign need to be applied may be signaled by the network. The trigger quantity for which an opposite inequality sign need to be applied may be preset by the UE.

(4) In the above embodiment, the serving AP and the target AP may employ different RATs. For example, the serving AP may be an LTE cell and the target AP may be a WLAN AP.

<Second Embodiment>

(1) In the second embodiment, it is assumed that a measurement report-triggering condition is as follows.

Measurement report-triggering condition: A neighboring AP is better in terms of all trigger quantities set by a network than a serving AP.

The measurement report-triggering condition may be expressed by the following inequality.

Inequality 3: Measurement result of neighboring AP>Measurement result of serving AP (2) Suppose that two trigger quantities are set by the network. The two trigger quantities may be WLAN beacon RSSI and channel utilization.

(3) Then, inequality 3 may be extended as follows. When both inequality 3a and inequality 3b are satisfied, a UE may report a measurement result to the network. However, when at least one of inequality 3a and inequality 3b is not satisfied, the UE may stop reporting a measurement result.

Inequality 3a: WLAN beacon RSSI measurement result of neighboring AP>WLAN beacon RSSI measurement result of serving AP Inequality 3b: Channel utilization measurement result of neighboring AP<Channel utilization measurement result of serving AP An inequality sign for channel utilization may be opposite to the inequality sign of inequality 3.

(4) In the above embodiment, the serving AP and the target AP may employ the same RAT. For example, the serving AP and the target AP may be WLAN APs.

<Third Embodiment>

(1) An event for inter-mobility set mobility will be described. The event for inter-mobility set mobility may be a measurement report-triggering condition used to change a WLAN mobility set. The WLAN mobility set may include one or more WLAN APs.

(2) The event may include two conditions. For convenience of explanation, the two conditions are defined as event condition A and event condition B. When event condition A and event condition B are satisfied, a UE may consider that the reporting condition is satisfied. Regarding event condition A, when at least one of trigger quantities set by a network is satisfied, the UE may consider that event condition A is satisfied. Regarding event condition B, when all of the trigger quantities set by the network are satisfied, the UE may consider that event condition B is satisfied. The trigger quantities set by the network may be a threshold corresponding to the trigger quantities.

Event condition A may be a measurement report-triggering condition associated with a WLAN AP belonging to the WLAN mobility set. Event condition B may be a measurement report-triggering condition associated with a WLAN AP that does not belong to the WLAN mobility set (i.e., that is outside of the WLAN mobility set).

(3) For example, in the third embodiment, it is assumed that the measurement report-triggering condition is as follows.

Measurement report-triggering condition: The UE cannot detect a WLAN AP having a value better than a threshold among WLAN APs belonging to the WLAN mobility set, and a WLAN AP not belonging to the WLAN mobility set has a value better than the threshold.

The measurement report-triggering condition may be expressed by the following inequalities.

Inequality 4: Measurement result of WLAN AP belonging to WLAN mobility set<Threshold Inequality 5: Measurement results of WLAN AP not belonging to WLAN mobility set>Threshold 4) Suppose that two trigger quantities are set by the network. The two trigger quantities may be WLAN beacon RSSI and a backhaul rate.

(5) Then, inequality 4 and inequality 5 may be extended as follows. When at least one of inequality 4a and inequality 4b is satisfied and both inequality 5a and inequality 5b are satisfied, the UE may consider that the measurement report-triggering condition is satisfied.

Inequality 4a: Measurement result of WLAN AP belonging to WLAN mobility set<WLAN beacon RSSI threshold Inequality 4b: Measurement result of WLAN AP belonging to WLAN mobility set<Backhaul rate threshold Inequality 5a: Measurement results of WLAN AP not belonging to WLAN mobility set>WLAN beacon RSSI threshold Inequality 5b: Measurement results of WLAN AP not belonging to WLAN mobility set>Backhaul rate threshold For example, when the UE fails to detect a WLAN AP having a measurement result that is better than the WLAN beacon RSSI threshold in the WLAN mobility set, a measurement result of a WLAN AP not belonging to the WLAN mobility set is better than the WLAN beacon RSSI threshold, and a measurement result of the WLAN AP not belonging to the WLAN mobility set is better than the backhaul rate threshold, the UE may transmit the WLAN measurement results to a BS.

For example, when the UE fails to detect a WLAN AP having a measurement result that is better than the backhaul rate threshold in the WLAN mobility set, a measurement result of a WLAN AP not belonging to the WLAN mobility set is better than the WLAN beacon RSSI threshold, and a measurement result of the WLAN AP not belonging to the WLAN mobility set is better than the backhaul rate threshold, the UE may transmit the WLAN measurement results to the BS.

(6) In the third embodiment, when the two set trigger quantities are a WLAN beacon RSSI and channel utilization, inequality 4 and inequality 5 may be extended as follows. When at least one of inequality 4c and inequality 4d is satisfied and both inequality 5c and inequality 5d are satisfied, the UE may consider that the measurement report-triggering condition as satisfied.

Inequality 4c: Measurement result of WLAN AP belonging to WLAN mobility set<WLAN beacon RSSI threshold Inequality 4d: Measurement result of WLAN AP belonging to WLAN mobility set>Channel utilization threshold Inequality 5c: Measurement result of WLAN AP not belonging to WLAN mobility set>WLAN beacon RSSI threshold Inequality 5d: Measurement result of WLAN AP not belonging to WLAN mobility set<Channel utilization threshold For example, when the UE fails to detect a WLAN AP having a measurement result that is better than the WLAN beacon RSSI threshold in the WLAN mobility set, a measurement result of a WLAN AP not belonging to the WLAN mobility set is better than the WLAN beacon RSSI threshold, and a measurement result of the WLAN AP not belonging to the WLAN mobility set is worse than the channel utilization threshold, the UE may transmit the WLAN measurement results to a BS.

For example, when the channel utilization of the WLAN mobility set to which the UE belongs is greater than the channel utilization threshold, a measurement result of a WLAN AP not belonging to the WLAN mobility set is better than the WLAN beacon RSSI threshold, and a measurement result of the WLAN AP not belonging to the WLAN mobility set is worse than the channel utilization threshold, the UE may transmit the WLAN measurement results to the BS.

Figure 9:
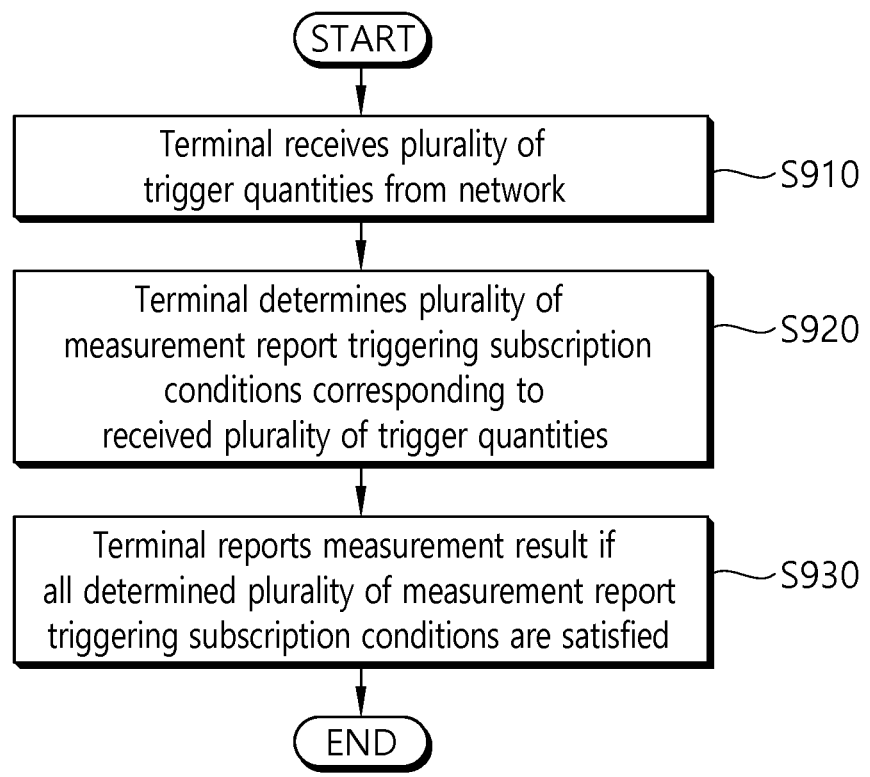
FIG. 9 is a block diagram illustrating a method for a UE to report a measurement repot according to an embodiment of the present invention.

FIG. 9 is a block diagram illustrating a method for a UE to report a measurement repot according to an embodiment of the present invention.

Referring to FIG. 9, the UE may receive a plurality of trigger quantities from a network in step S910.

When an AP of the UE is a WLAN, the plurality of trigger quantities may include at least one of wireless channel information, load information, and backhaul information. The load information may be at least one of available admission, channel utilization, and a station count. The backhaul information may be at least one of an UL backhaul rate and a DL backhaul rate. The wireless channel information may be a WLAN beacon RSSI.

When the AP of the UE is LTE, the plurality of trigger quantities may be wireless channel information. The wireless channel information may be at least one of a RSRP and a RSRQ.

In step S920, the UE may determine a plurality of measurement report triggering-entering conditions corresponding to the plurality of received trigger quantities.

The plurality of measurement report triggering-entering conditions may be determined based on a conventional measurement report triggering-entering condition and the trigger quantities. The conventional measurement report triggering-entering condition may be at least one of events A1 to A6, event B1, event B2, event C1, event C2, and an event for a WLAN measurement report.

The direction of the inequality sign of the measurement report triggering-entering condition may change depending on the trigger quantities. The trigger quantities changing the direction of the inequality sign may be set by the network. The trigger quantities changing the direction of the inequality sign may be set by the UE.

For example, the direction of the inequality sign of a measurement report triggering-entering condition corresponding to the channel utilization or the station count may be determined to be opposite to the direction of the inequality sign of a measurement report triggering-entering condition corresponding to the available admission.

For example, when the conventional measurement report triggering-entering condition is a condition in which a measurement result of a neighboring AP is better than a measurement result of a serving AP and the plurality of trigger quantities is a WLAN beacon RSSI and channel utilization, the plurality of measurement report triggering-entering conditions may be determined to be a condition in which the WLAN beacon RSSI measurement result of the neighboring AP is better than the WLAN beacon RSSI measurement result of the serving AP and the channel utilization measurement result of the neighboring AP is worse than the channel utilization measurement result of the serving AP.

The plurality of trigger quantities may include the threshold of the plurality of trigger quantities. The plurality of measurement report triggering-entering condition may be determined to compare the measurement result of the plurality of trigger quantities with the threshold of the plurality of trigger quantities.

In step S930, when all of the plurality of determined measurement report triggering-entering conditions is satisfied, the UE may report the measurement result.

The UE may determine a plurality of measurement report triggering-leaving conditions corresponding to the plurality of received trigger quantities. When at least one of the plurality of determined measurement report triggering-leaving conditions is satisfied, the UE may stop reporting the measurement result. The direction of the inequality sign of the measurement report triggering-leaving conditions may change depending on the trigger quantities.

Figure 10:
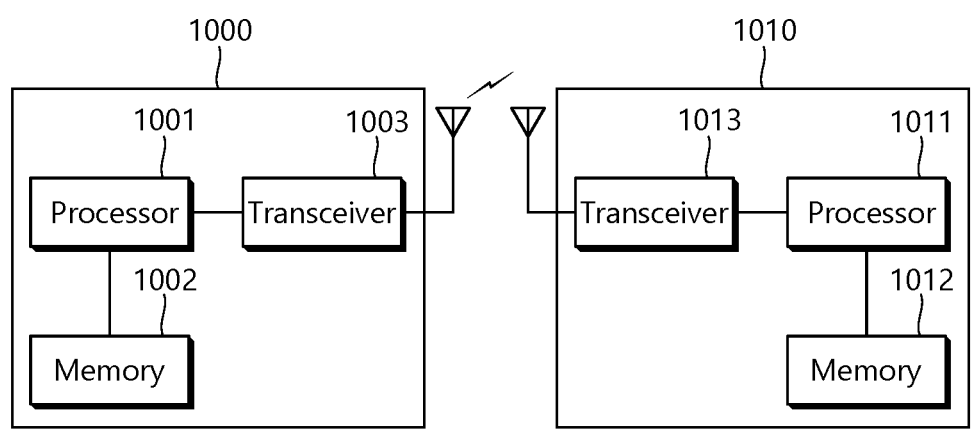
FIG. 10 is a block diagram illustrating a wireless communication system according to the embodiment of the present invention.

FIG. 10 is a block diagram illustrating a wireless communication system according to the embodiment of the present invention.

A BS 1000 includes a processor 1001, a memory 1002 and a transceiver 1003. The memory 1002 is connected to the processor 1001, and stores various pieces of information for driving the processor 1001. The transceiver 1003 is connected to the processor 1001, and transmits and/or receives radio signals. The processor 1001 implements proposed functions, processes and/or methods. In the above embodiment, an operation of the base station may be implemented by the processor 1001.

A UE 1010 includes a processor 1011, a memory 1012 and a transceiver 1013. The memory 1012 is connected to the processor 1011, and stores various pieces of information for driving the processor 1011. The transceiver 1013 is connected to the processor 1011, and transmits and/or receives radio signals. The processor 1011 implements proposed functions, processes and/or methods. In the above embodiment, an operation of the UE may be implemented by the processor 1011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for reporting, by a user equipment (UE), a measurement result in a wireless communication system, the method comprising:
receiving a plurality of trigger quantities from a network;
determining a plurality of measurement report triggering-entering conditions corresponding to the plurality of received trigger quantities; and
reporting a measurement result when all of the plurality of determined measurement report triggering-entering conditions is satisfied,
wherein the plurality of measurement report triggering-entering conditions is determined based on a conventional measurement report triggering-entering condition and the plurality of trigger quantities, and
wherein when the conventional measurement report triggering-entering condition is a condition in which a measurement result of a neighboring access point (AP) is better than a measurement result of a serving AP and the plurality of trigger quantities is a WLAN beacon received signal strength indicator (RSSI) and channel utilization, the plurality of measurement report triggering-entering conditions is determined to be a condition in which a Wireless Local Area Network (WLAN) beacon RSSI measurement result of the neighboring AP is better than a WLAN beacon RSSI measurement result of the serving AP and a channel utilization measurement result of the neighboring AP is worse than a channel utilization measurement result of the serving AP.

2. The method of claim 1, wherein when an AP of the UE is a WLAN, the plurality of trigger quantities comprises at least one of wireless channel information, load information, and backhaul information.

3. The method of claim 2, wherein the load information is at least one of available admission, channel utilization, and a station count.

4. The method of claim 3, wherein a direction of an inequality sign of a measurement report triggering-entering condition corresponding to the channel utilization or the station count is determined to be opposite to a direction of an inequality sign of a measurement report triggering-entering condition corresponding to the available admission.

5. The method of claim 2, wherein the backhaul information is at least one of an uplink backhaul rate and a downlink backhaul rate.

6. The method of claim 2, wherein the wireless channel information is a WLAN beacon RSSI.

7. The method of claim 1, wherein when an AP of the UE is LTE, the plurality of trigger quantities is wireless channel information, and the wireless channel information is at least one of a reference signal received power (RSRP) and a reference symbol received quality RSRQ.

8. The method of claim 1, wherein a direction of an inequality sign of the measurement report triggering-entering conditions changes depending on the plurality of trigger quantities.

9. The method of claim 8, wherein the plurality of trigger quantities changing the direction of the inequality sign is set by the network.

10. The method of claim 1, wherein the plurality of trigger quantities comprises a threshold of the plurality of trigger quantities.

11. The method of claim 10, wherein the plurality of measurement report triggering-entering conditions is determined to compare a measurement result of the plurality of trigger quantities with the threshold of the plurality of trigger quantities.

12. The method of claim 1, further comprising:
determining, by the UE, a plurality of measurement report triggering-leaving conditions corresponding to the plurality of received trigger quantities; and
stopping reporting of the measurement result when at least one of the plurality of determined measurement report triggering-leaving conditions is satisfied.

13. A user equipment (UE) for reporting a measurement result in a wireless communication system, the UE comprising:
a memory;
a transceiver; and
a processor coupled with the memory and the transceiver, wherein the processor is configured to:
control the transceiver to receive a plurality of trigger quantities from a network;
determine a plurality of measurement report triggering-entering conditions corresponding to the plurality of received trigger quantities; and
report a measurement result when all of the plurality of determined measurement report triggering-entering conditions is satisfied,
wherein the plurality of measurement report triggering-entering conditions is determined based on a conventional measurement report triggering-entering condition and the plurality of trigger quantities, and
wherein when the conventional measurement report triggering-entering condition is a condition in which a measurement result of a neighboring access point (AP) is better than a measurement result of a serving AP and the plurality of trigger quantities is a Wireless Local Area Network (WLAN) beacon received signal strength indicator (RSSI) and channel utilization, the plurality of measurement report triggering-entering conditions is determined to be a condition in which a WLAN beacon RSSI measurement result of the neighboring AP is better than a WLAN beacon RSSI measurement result of the serving AP and a channel utilization measurement result of the neighboring AP is worse than a channel utilization measurement result of the serving AP.

* * * * *